United States Patent [19]
Cogan et al.

[11] Patent Number: 5,327,281
[45] Date of Patent: Jul. 5, 1994

[54] SOLID POLYMERIC ELECTROLYTES FOR ELECTROCHROMIC DEVICES HAVING REDUCED ACIDITY AND HIGH ANODIC STABILITY

[75] Inventors: Stuart F. Cogan, Sudbury; R. David Rauh, Newton, both of Mass.

[73] Assignee: EIC Laboratories, Norwood, Mass.

[21] Appl. No.: 872,224

[22] Filed: Apr. 23, 1992

[51] Int. Cl.$^5$ .................. G02F 1/153; G02B 5/23
[52] U.S. Cl. ................... 359/270; 359/269; 359/265; 252/586
[58] Field of Search .......... 359/265, 269, 270; 252/586

[56] References Cited

U.S. PATENT DOCUMENTS

| | | | |
|---|---|---|---|
| 4,174,152 | 11/1979 | Giglia et al. | 350/357 |
| 4,231,641 | 11/1980 | Randin | 350/357 |
| 4,312,929 | 1/1982 | Randin | 204/242 |
| 4,335,938 | 6/1982 | Giglia et al. | 350/357 |
| 4,340,278 | 7/1982 | Beni et al. | 359/270 |
| 4,361,385 | 11/1982 | Huang et al. | 350/357 |
| 4,375,318 | 3/1983 | Giglia et al. | 350/357 |
| 4,478,991 | 10/1984 | Huang et al. | 526/287 |
| 4,519,930 | 5/1985 | Kakiuchi | 340/785 |
| 4,573,768 | 3/1986 | Polak et al. | 359/270 |

FOREIGN PATENT DOCUMENTS

| | | | |
|---|---|---|---|
| 0083988 | 7/1983 | European Pat. Off. | 359/270 |
| 0259231 | 11/1986 | Japan | 359/270 |

OTHER PUBLICATIONS

Jean-Paul Randin, "Ion-Containing Polymers as Semi-solid Electrolytes in $WO_3$-Based Electrochromic Devices", J. Electrochem. Soc. 129, pp. 1215-1220 Jun. 1982.

R. D. Giglia and G. Haacke, "Performance Improvements in $WO_3$-Based Electrochromic Displays," Proc. SID, 23(1), pp. 41-45 (1982).

*Primary Examiner*—Bruce Y. Arnold
*Assistant Examiner*—Evelyn A. Lester
*Attorney, Agent, or Firm*—Christopher Blank; James Sullivan

[57] ABSTRACT

Polymer electrolytes comprising co-polymers of vinylic, protonic acids and N,N' dialkyl substituted acrylamides and methacrylamides with high anodic stability, reduced acidity and high mechanical stiffness suitable for electrochromic devices, such as windows, mirrors and information displays. A preferred embodiment of the invention is a co-polymer with a composition of 30% 2-acrylamido-2-methyl propane sulfonic acid, 50% N,N dimethyl acrylamide and 20% water by weight.

10 Claims, 5 Drawing Sheets

SOLID POLYMERIC ELECTROLYTES FOR ELECTROCHROMIC DEVICES HAVING REDUCED ACIDITY AND HIGH ANODIC STABILITY

FIELD OF THE INVENTION

This invention relates to electrochromic devices and particularly to ion-conducting polymeric electrolyte components of such devices. More particularly, this invention relates to formulations of the electrolyte that 1) have a high degree of stability when subjected to positive voltages experienced during the operation of electrochromic light modulators and displays, and 2) have relatively low acidity, thus enhancing the stability of electrochromic materials such as $WO_3$ used in such devices.

BACKGROUND OF THE INVENTION

Electrochromic devices have important applications as variable transmission windows and eyewear, and as displays for watches, calculators, computers, price signs and updated schedule information in airports and train stations. Electrochromic devices change optical transmittance or reflectance in response to a voltage applied between two terminals on the device. Since the degree of optical modulation is directly proportional to the current flow induced by the applied voltage, electrochromic devices have the capability of continuous tunability of light absorption or reflectance. In addition, such devices exhibit long-term retention of an optical state once achieved, requiring no power consumption to maintain that optical state.

Electrochromic materials variably attenuate light in some region of the electromagnetic spectrum, typically the visible region, on electrochemical oxidation or reduction. The oxidation and reduction reactions must be reversible, as devices are usually required to operate for many switching cycles. Tungsten trioxide ($WO_3$) is a classic example of an electrochromic material. In an acid electrolyte, $WO_3$, which is virtually colorless in thin film form, is reduced electrochemically to a deep blue color with the simultaneous insertion of charge compensating hydrogen ions, i.e.,

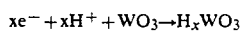

$$xe^- + xH^+ + WO_3 \rightarrow H_xWO_3$$

In display applications, the $WO_3$ is usually deposited as an amorphous (non-crystalline) thin film onto optically transparent, electrically conductive alphanumeric electrode segments. The electrode segments are usually comprised of thin films of optically transparent, electrically conductive oxides such as tin-doped indium oxide (ITO) or fluorine-doped tin oxide (SFO) patterned onto glass. In certain display or mirror applications, metals may be used for some of the thin film electrodes. The deposited $WO_3$ film is placed in contact with an ion conducting electrolyte, which is in turn in contact with a counter electrode which also undergoes reversible oxidation and reduction reactions. The electrolyte typically contains a pigment against which the optical modulation of the electrochromic layer is contrasted. The pigmented electrolyte is generally opaque so that the counter electrode is masked from view. Typical counter electrode materials in display devices are carbon containing oxidizable and reducible surface groups as taught by Giglia (U.S. Pat. No. 3,819,252, August 1974), or a second film of the electrochromic material as taught by Beegie (U.S. Pat. No. 3,704,057, November 1972).

In electrochromic windows and light modulators for transmittance control, further restrictions on the electrode materials and electrolyte exist. The counter electrode must be, at the very least, transparent to light of the wavelengths being modulated during oxidation and reduction. Examples of such materials are $Nb_2O_5$ and $TiO_2$ (S.Cogan et al., Proc. SPIE, vol 562, (1985), pp. 23–31) or "macroporous" crystalline $WO_3$ (U.S. Pat. No. 4,278,329, Matsuhiro et al., July 1981). Alternatively, the counter electrode could undergo electrochromic reactions which are complementary to the first electrode, i.e., if the first electrode is colored on reduction, then the counter electrode is colored on oxidation. In this way, the light modulation of the electrochromic electrode and the counter electrode is additive and reinforcing. Examples of electrochromic devices with complementary counter electrodes include: Takahashi et al., U.S. Pat. No. 4,350,414, September 1982; Cogan et al., Proc. SPIE, vol 823, pp. 106–112 (1987); and, Cogan and Rauh, U.S. Pat. No. 5,019,420, January 1992. For most variable transmittance applications, a transparent and colorless electrolyte is preferred to avoid interference with the light modulation.

The ion conducting electrolyte is a very important feature of an electrochromic device. If the electrolyte is a liquid, then, in assembling the device, the electrochromic and counter electrodes may be separated facing each other using a spacer, and the liquid electrolyte injected into the space between them. The cavity may then be sealed, for example, using epoxy. Such seals may leak, however. In order to minimize leakage, gelating agents such as poly(vinyl alcohol) have been added to liquid electrolytes to form semi-solid gels (U.S. Pat. No. 3,708,220, Meyers, January 1973).

Polymeric electrolytes, however, can more effectively alleviate the problem of electrolyte leakage by allowing the fabrication of laminated electrochromic devices in which the polymer has the dual function of ion conducting electrolyte and mechanical adhesive. Such polymers can be formulatedas standalone films with a satisfactory combination of mechanical integrity and ionic conductivity. One class of such electrolytes is the ion-containing polymers known as ionomers. These macromolecules contain ionizable groups covalently linked to a polymer chain, typically a hydrocarbon. Thus, the compounds polystyrene sulfonic acid and poly (2-acrylamido-2-methyl-1-propanesulfonic acid) (polyAMPS) are examples of ionomers, both incorporating the protonic acid -$SO_3H$ group on the polymer chain. Ionomers are formed by polymerizing monomers bearing the ionizable group and also a C=C vinylic group, such reactions being initiated, for example, by heat, light or high energy radiation and frequently with the aid of an initiator added as a minor component.

There have been frequent references in prior art to ionomer-based electrolytes for electrochromic devices and for batteries. Giglia et al. (U.S. Pat. No. 4,335,938, June 1982) teaches a polymer electrolyte comprising polyAMPS and $H_2O$ and further teaches (U.S. Pat. No. 4,375,318, Giglia, January 1983) a homopolymer of polyAMPS with an added organic "humectant" such as polyethylene oxide. Randin (U.S. Pat. No. 4,231,641, November 1980) teaches polystyrene sulfonic acid in electrochromic devices and further teaches (U.S. Pat. No. 4,312,929, Randin, January 1982) a polymeric electrolyte comprising a sulfonic protonic polymer and $H_2O$. A discussion of the relationship between polymer composition and performance in electrochromic devices can be found in "Performance Improvements in $WO_3$-Based Electrochromic Displays", Proc. SID, vol. 23, p. 1, 1982, by R.D. Giglia and G. Haacke.

In order to function effectively in an electrochromic device over a large number of switching cycles, a polymeric electrolyte should have the following properties:

High oxidative stability. Since electrochromic devices are electrochemical in nature, electrolytes are required which have a high degree of stability at negative and positive polarizations. Prior art concerning co-polymers of vinyl resins and acid-group containing monomers has not addressed oxidative stability in electrochromic devices. Many polymers in prior art are oxidatively unstable. For example, alcohols are readily oxidized in acidic media. An example of an alcohol used in prior art polymeric electrolytes is 2-hydroxyethyl methacrylate (HEMA). Giglia, in U.S. Pat. No. 4,174,152 November 1979, discloses electrochromic devices with binary co-polymer electrolytes prepared from 95–20% of a specified hydroxy alkyl acrylate monomer, of which HEMA is one, and 5–80% of an "acid-group-containing monoethylenically unsaturated monomer". The hydroxy group on the HEMA co-polymer, as demonstrated herein by example, is very susceptible to irreversible oxidation during the operation of an electrochromic device.

Low acidity. It has been demonstrated by Randin (J. Electrochem. Soc., vol 129, 1215 (1982)) that $WO_3$, a ubiquitous and frequently used electrochromic material, is subject to acid hydrolysis leading to gradual dissolution of the electrochromic film and a decline in optical switching performance. Many prior art polymer formulations, particularly those comprised solely of hydrated sulfonic acid ionomers, were found to be deficient in that they caused excessive dissolution of $WO_3$ and reduced the useful life of electrochromic devices. Several approaches to improving the stability of $WO_3$ in acid electrolyte devices were reported. Randin, U.S. Pat. No. 4,312,929 op cit, teaches polymer compositions in which this hydrolysis is partly relieved by employing acidic ionomer electrolytes in which the water is of sufficiently low concentration as to be tightly bound to the anionic groups on the polymer chain. Other methods of minimizing dissolution of the electrochromic layer in contact with the polymer electrolyte include the use of thin layers of less hydrophylic polymers with lower ionic conductivity interposed between the electrochromic layer and the polymer electrolyte (Giglia and Haacke, Proc. SID, op cit) and the use of an inorganic insulator coating on the electrochromic electrode (U.S. Pat. No. 4,193,670, Giglia and Clasen, March 1980).

High mechanical stiffness. Mechanical stiffness differentiates true polymer and plasticized polymer electrolytes from "semisolid" and "gel" electrolytes often referred to in prior art. Mechanically stiff electrolytes are able to support their own weight and retain their shape as stand-alone membranes. They are thus able to act as separators in electrochromic devices. There is frequently a trade-off between mechanical stiffness, controlled by the amount of liquid phase plasticizer, and ionic conductivity. The conductivity increases with increasing plasticizer concentration but the polymer becomes increasingly less viscous, and eventually acquires a gel-like or liquid consistency. In addition, for proton conducting polymers, higher plasticizer concentrations, particularly when the plasticizer is $H_2O$, can lead to higher acidities and increased acid hydrolysis of electrochromic materials.

The long-term cyclability of electrochromic devices that employ polymer electrolytes, therefore, depends on achieving oxidative stability and low acidity in a polymer that has the requisite mechanical stiffness to act as a laminant or separator in the device. In addition, the ionic conductivity of the polymer must be high enough that electrochromic devices employing the polymer can switch at speeds fast enough for practical applications.

SUMMARY OF THE INVENTION

The present invention relates to a polymer electrolyte that is useful in electrochromic displays and windows in that it has three favorable properties: 1) high oxidative stability, 2) low acidity controllable by composition, and 3) sufficient mechanical stiffness to function as a separator in the device. Electrochromic windows and displays incorporating this electrolyte are characterized by their insensitivity to voltage extremes, their long cycle life and their ease of fabrication.

The polymer electrolyte is a co-polymer comprised of a vinylic anionic monomer and a second monomer of either a N.N' dialkyl substituted acrylamide or a N.N' dialky substituted methacrylamide, or a mixture of the two, the polymer being further modified, as necessary, by the addition of a liquid plasticizing agent to achieve the desired level of ionic conductivity.

DETAILED DESCRIPTION OF THE INVENTION

Figure 1:
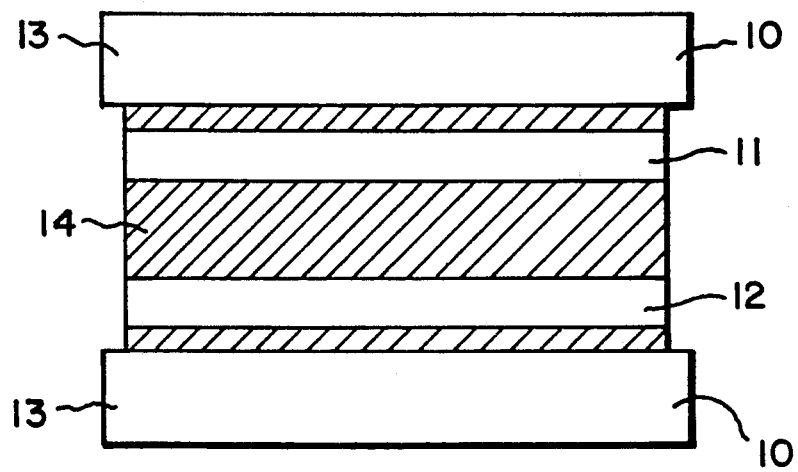
FIG. 1 is a cross-sectional view of an electrochromic device embodying the co-polymer of the present invention.

While it has been recognized in prior art that electrolyte layers based on ion exchange polymers are useful in electrochromic devices, this invention specifies polymer electrolytes that are stable under the large oxidative voltage excursions that can occur during electrochromic device operation. A further aspect of the invention is that the acidity of the electrolyte can be controlled by adjusting the composition, thus enabling the formulation of electrolytes with excellent long-term stability towards acid-sensitive electrochromic elements such as amorphous $WO_3$.

The requirement for oxidatively stable formulations is illustrated by reference to an electrochromic variable transmission device in which the two active electrochromic materials are $WO_3$ and $IrO_2$. Such a device has been referred to in prior art as "complementary", in that WO₃ colors on reduction and IrO₂ on oxidation. Thus, the half reactions describing the electrochemical operation of the device may be represented as:

$$WO_3 + xH^+ + xe^- \leftrightarrow H_xWO_3$$

$$H_xIrO_2 \rightarrow IrO_2 + x'H^+ + x'e^-$$

When these electrodes are assembled in an electrochromic device, the device will have two electrode terminals, one connected to the conductive substrate bearing the WO₃ and the other connected to the conductive substrate bearing the $H_x$, IrO₂. Let this represent the most transparent state of the device, analogous to the discharged state of a battery. If one could probe the electrochemical potential of the WO₃ and the $H_x$, IrO₂, the potential of the WO₃ would be at >0.6 V versus the standard calomel reference electrode (SCE) while that of the $H_x$, IrO₂ would typically lie at less than 0 V. If a power source is connected to the terminals such that electrons enter the WO₃ electrode and are extracted from the $H_x$, IrO₂ electrode, the device will be converted in a continuous fashion to the colored state. In the extreme colored state, the WO₃ will have been converted to $H_x$ WO₃ and the $H_x$, IrO₂ will have been converted to IrO₂. Now, the individual electrode potentials will be typically less than −0.3 V for $H_x$ WO₃ and >1 V for IrO₂. These potentials have been reported by Cogan et al., Proc. SPIE vol. 823, 106–112 (1987). Thus, we note that the electrolyte must not undergo oxidation reactions at the potential seen by the WO₃ when the device is in its bleached state and the IrO₂ when the device is in its most colored state. In order to avoid irreversible oxidation, therefore, the electrolyte must be stable to >1 V versus SCE.

The same analysis can also be extended to electrochromic devices viewed in reflectance, such as those bearing a carbon counter electrode hidden by an opacified electrolyte. Here, when the image is colored, a positive potential must be placed at the counter electrode. Hence, the counter electrode-electrolyte interface is subject to oxidative degradation which may be exacerbated during coloration with a pulsed waveform.

The deficiency of prior art polymer electrolytes in failing to maintain oxidative stability is detailed in Example 1 for a HEMA-AMPS co-polymer which is useful for minimizing acid hydrolysis of WO₃ (Giglia and Haacke, Proc. SID, op cit.). After only a few switching cycles, the irreversible oxidation of the hydroxy group on the HEMA component of the polymer leads to incomplete bleaching to the transmissive state and failure by bubble formation in the polymer. Efforts to avoid this degradation in devices with HEMA-AMPS by coating the electrochromic layers with thin film inorganic proton conducting layers such as hydrated Ta₂O₅ were unsuccessful. The electronic leakage current through the Ta₂O₅ or permeation of the Ta₂O₅ by the polymer always led to polymer oxidation and device failure. Thus, some prior art approaches to improving cyclability, the use of inorganic interlayers (U.S. Pat. No. 4,193,670, op cit) and low acidity co-polymers (Giglia and Haacke, Proc. SID, op cit), are ineffective against oxidative degradation although they reduce acid hydrolysis of amorphous WO₃.

We have found that co-polymers of anion-bearing vinylic monomers and certain nonionic amide monomers exhibit excellent oxidative stability and avoid acid hydrolysis of WO₃ while retaining the necessary mechanical properties to function as a rigid, adhesive interlayer in electrochromic devices. Amides are normally subject to electrooxidation (see S. D. Ross et al. in *Anodic Oxidation*, Academic Press, New York, 1975, p.226-227) and might initially appear to be a poor choice for improving oxidative stability. However, in acidic aqueous media, protonation of the amide functional group suppresses oxidation due to the complexation of the lone pair electrons on the nitrogen atom which normally take part in the oxidation reaction. Electron donating groups attached to the nitrogen, such as -CH₃, enhance the basicity of the amide group thus favoring protonation and increasing oxidative stability. Hence, a particularly stable monomer will be an amide containing N,N' dialkyl group rather than N-H groups which have been listed in some prior art teaching (U.S. Pat. No. 4,174,152, op cit). A dialkyl substitution on the amide group is necessary to achieve the highest level of anodic stability. The N,N' notation indicates that both alkyl groups are bonded to the amide nitrogen.

The non-ionic monomers of the present invention, therefore, are an N,N'-dialkyl acrylamide of general formula:

$$CH_2=CHCONRR'$$

and an N,N'-dialkyl methacrylamide of general formula:

$$CH_2=C(CH_3)CONRR'$$

where R and R' are alkyl substituents.

Examples of suitable anionic, vinylic monomers include ethylene sulfonic acid, 2-propene-1-sulfonic acid, p-styrene sulfonic acid, 2-acrylamido-2-methylpropane sulfonic acid (AMPS), vinyl sulfonic acid, fumaric acid, 4-vinyl benzoic acid, vinyl acetic acid and their Li⁺ and Na⁺ salts.

The electrolyte of the present invention, therefore, is a co-polymer comprised of one or more vinylic anion-bearing monomers and a N,N'-dialkyl substituted acrylamide or N,N'-dialkyl substituted methacrylamide monomer. The co-polymer can be used either alone or in combination with a third unreactive polar liquid additive that acts as a plasticizer and enhances ionic conductivity. Examples of plasticizing additives include water, propylene carbonate, γ-butyrolactone, dimethyl formamide, N-methyl pyrrolidone, ethyl acetate, acetonitrile, ethanol, methanol, and ethylene glycol.

In a preferred embodiment of the present invention, it was found that co-polymers of AMPS and N,N'-dimethyl acrylamide (DMAA) containing up to 25 weight percent H₂O as a plasticizer are rigid and self-supporting and can be used as both the electrolyte and separator in electrochromic devices. The co-polymer does not cause significant acid hydrolysis of WO₃. The aforementioned polymer has a high ionic conductivity, >10⁻⁶ S/cm, and is useful in many electrochromic device applications. The acidity of the polymer can be controlled by varying the ratio of the DMAA and AMPS monomers. A higher concentration of the DMAA monomer produces a less acidic (higher pH) co-polymer that further reduces acid hydrolysis of WO₃. Polyacrylamides are generally hard and brittle and are known for their high tensile strength; it is thus reasonable that their co-polymers with ionophores, species containing ionizable groups, should retain some of these properties.

In another embodiment, the co-polymer of the present invention is incorporated into an electrochromic device for the purpose of modulating light. A preferred structure for such an electrochromic device is revealed in FIG. 1. The device is comprised of two substrates (10), each coated with an electronically conductive electrode film (13). At least one of the substrates is transparent and the conductive film on the transparent substrate should itself be substantially transparent. An electrochromic film capable of reversible oxidation and reduction (11) is deposited on one of the conductive electrode films and a reversible counter electrode film (12) deposited on the other conductive electrode film. Disposed between the coated substrates is the polymer of the present invention (14). On the application of a suitable voltage between the two conductive electrode films, the electrochromic and counter electrode films will be oxidized and reduced in accordance with the polarity and magnitude of the applied voltage. In order to maintain charge neutrality within the electro-active layers, an ionic current flows through the polymer. It is preferable to pre-reduce one or both of the electrochromic and counter electrode layers with a sufficient quantity of charge to maintain the desired neutrality without causing irreversible electrochemical processes during optical switching. The charge compensating ion chosen for pre-reduction will be one suitable for conduction by the polymer and suitable as a counter-ion in the electrochromic layers. Thus if $WO_3$ and $IrO_2$ are chosen as the electrochromic and counter electrode materials, the hydrogen ion ($H^+$) is required for charge compensation and the anionic co-monomer should be of the type suitable for $H^+$ ion conduction. Likewise, if $WO_3$ and $Li_yCrO_{2+x}$ are chosen as the electrochromic and counter electrode materials, as disclosed by Cogan et al. in U.S. Pat. No. 5,019,420 January 1992, the lithium ion ($Li^+$) is required for charge compensation and the anionic co-monomer should be of the type suitable for $Li^+$ ion conduction.

Modifications to the co-polymer of the present invention may be made to tailor optical or mechanical properties for specific applications. For example, the co-polymer as described previously is substantially transparent in the visible spectrum. An electrochromic display device, of the type that is optically opaque and modulates by a change in color or reflectance, can be obtained by adding either an inorganic pigment or a chemical dye to the polymer. Thus, titania or lead chromate are added during the polymerization process to produce a opaque white or opaque yellow polymer, respectively. Many such pigments are available commercially with a broad range of colors. The pigment particles are generally coated with silica to improve their chemical and photochemical stability.

The mechanical properties of the polymer may be modified by the addition of suitable cross-linking agents. Preferred cross-linking agents are molecules or low molecular weight polymers (oligomers) containing two or more vinyl groups. Examples of cross-linking agents include divinyl benzene, polyurethane oligomers terminated with vinyl groups, and N,N-diallylmethacrylamide. Many such cross-linking agents are available commercially and are well-known to practitioners of the art.

EXAMPLE 1

The following example illustrates the problem of oxidative instability in a prior art polymer electrolyte formulation when used in an electrochromic window.

Figure 2:
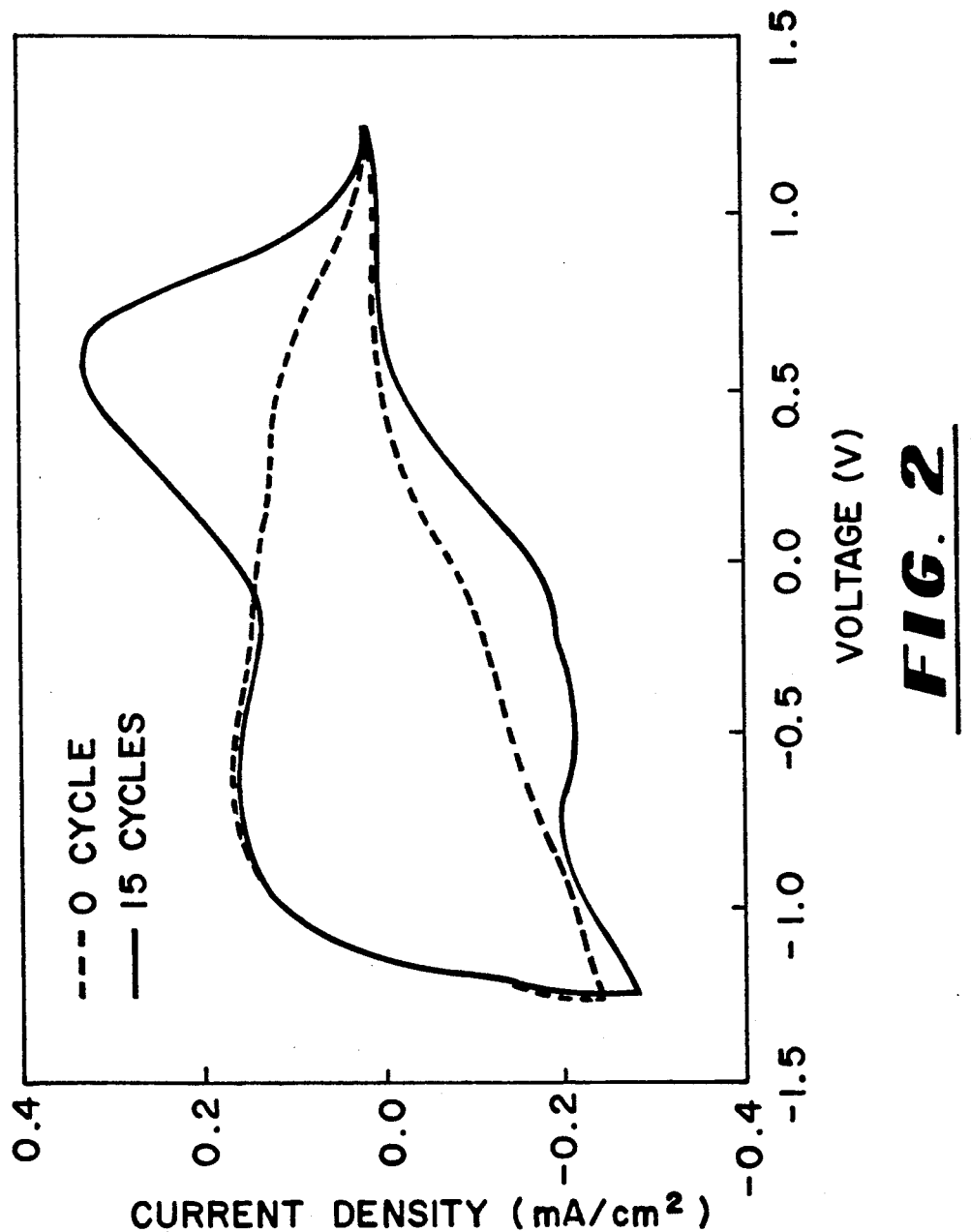
FIG. 2 shows the change in current-voltage characteristics of an electrochromic device using a prior art polymer.
Figure 3:
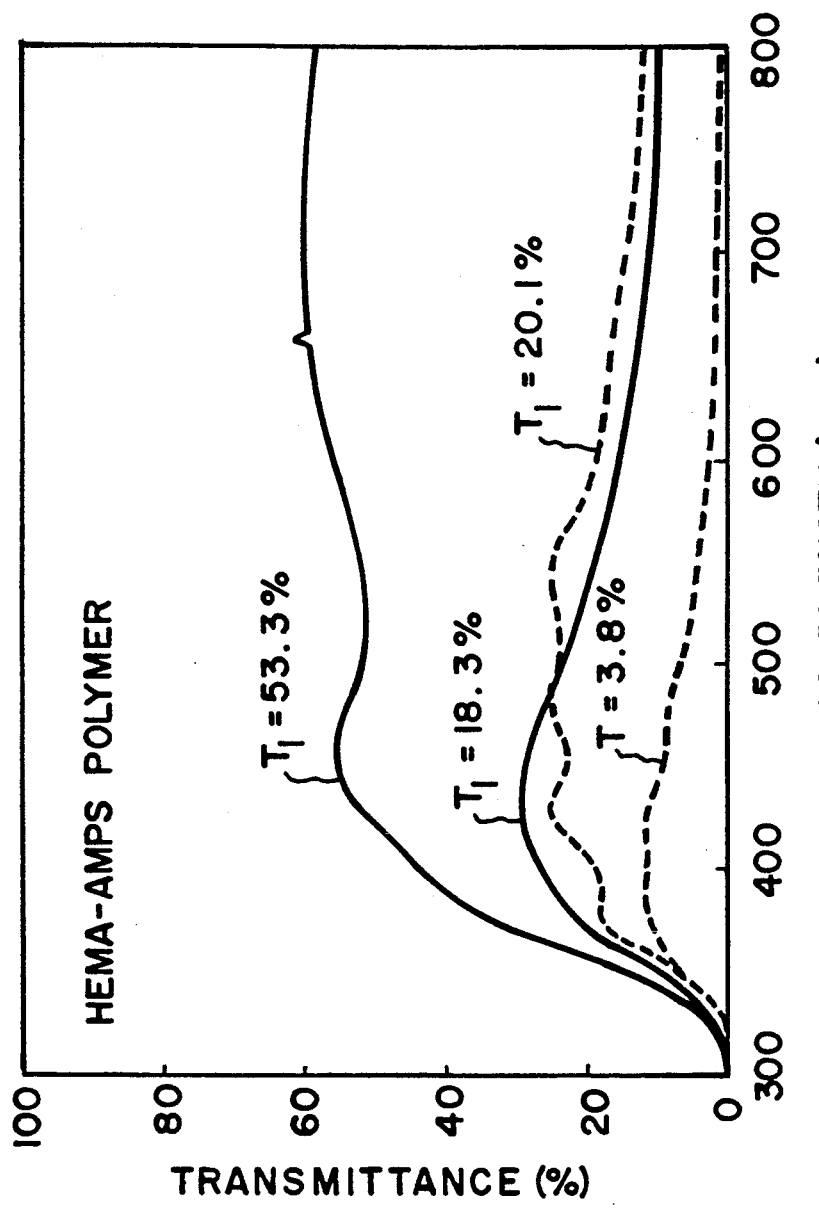
FIG. 3 shows the change in spectral transmittance after optical switching for 500 cycles of an electrochromic device using a prior art polymer.

A variable transmittance electrochromic device was fabricated using a co-polymer electrolyte with a composition of 73% 2-hydroxyethyl (HEMA), 17% 2-acrylamido-2-methylpropane sulfonic acid (AMPS), and 10% by weight of $H_2O$. A 200 nm thick film of amorphous $WO_3$ was deposited on a first ITO-coated glass slide by electron beam evaporation and a 20 nm thick film of $IrO_2$ was deposited on a second ITO-coated glass slide by reactive sputtering from an Ir metal target. The $IrO_2$ film was then electrochemically reduced in an 0.5M $H_2SO_4$ electrolyte to provide 15 $mC/cm^2$ of $H^+$ ions for charge compensation. A variable transmittance window was fabricated by laminating the coated surfaces of the slides with the HEMA-AMPS co-polymer. The electrochromic window was tested by making electriaal connection to the ITO contracts and applying a 20 mV/s triangular voltage sweep between limits of $\pm 1.3$ V. On the first few cycles, the window reversibly switched between a transparent and deep blue state. However, on succeeding cycles the window became irreversibly colored and failed by delamination and discoloration of the polymer electrolyte. The failure is due to oxidation of the 2-hydroxyethyl methacrylate co-polymer at the $IrO_2$ electrochromic layer. This irreversible oxidation process generates hydrogen ions ($H^+$) which serve as charge compensating ions for the electrochemical reduction of one or both of the electrochromic layers. After a short number of switching cycles, the $H^+$ concentration and degree of reduction exceeds the reversible reductive capacity of the a-$WO_3$ and $IrO_2$ electrochromic layers. When this happens irreversible side reactions, degradation and eventual failure of the window ensue. An example of the current-voltage behavior of a variable transmittance device with a HEMA-AMPS co-polymer is shown in FIG. 2. Between the first and fifteenth cycles a large increase in charge capacity (proportional to the area within the current-voltage curve) is observed. The loss of transmittance is shown in FIG. 3, wherein the initial minimum and maximum transmittance spectra (denoted by solid lines) of a device are compared with the transmittance specrra after 500 switching cycles (denoted by dashed lines). The initial luminous transmittance range of 18.3–53.3% is degraded to 3.8–20.1%. This example shows that the oxidative stability of $H^+$ conducting polymers is important for practical applications of electrochromic devices and, unless the polymer is formulated for oxidative stability, high-cycle lifetimes will not be achieved.

EXAMPLE 2

A polymer electrolyte was synthesized by polymerization of 3 g of 2-acrylamido-2-methylpropane sulfonic acid (AMPS) and 5 g of N,N'-dimethyl acrylamide in $H_2O$. A free radical initiator, DAROCUR 1173 from EM Industries, was added to the solution which was polymerized by exposure to a UV light source for 300 s. The co-polymer so formed was hard and self-supporting when the $H_2O$ content was adjusted to <25 weight %. The polymer laminated between two ITO-coated glass slides and the ionic conductivity measured by the AC impedance technique. The conductivity was $3 \times 10^{-5}$ S/cm which is suitable for electrochromic window and display applications.

EXAMPLE 3

Figure 4:
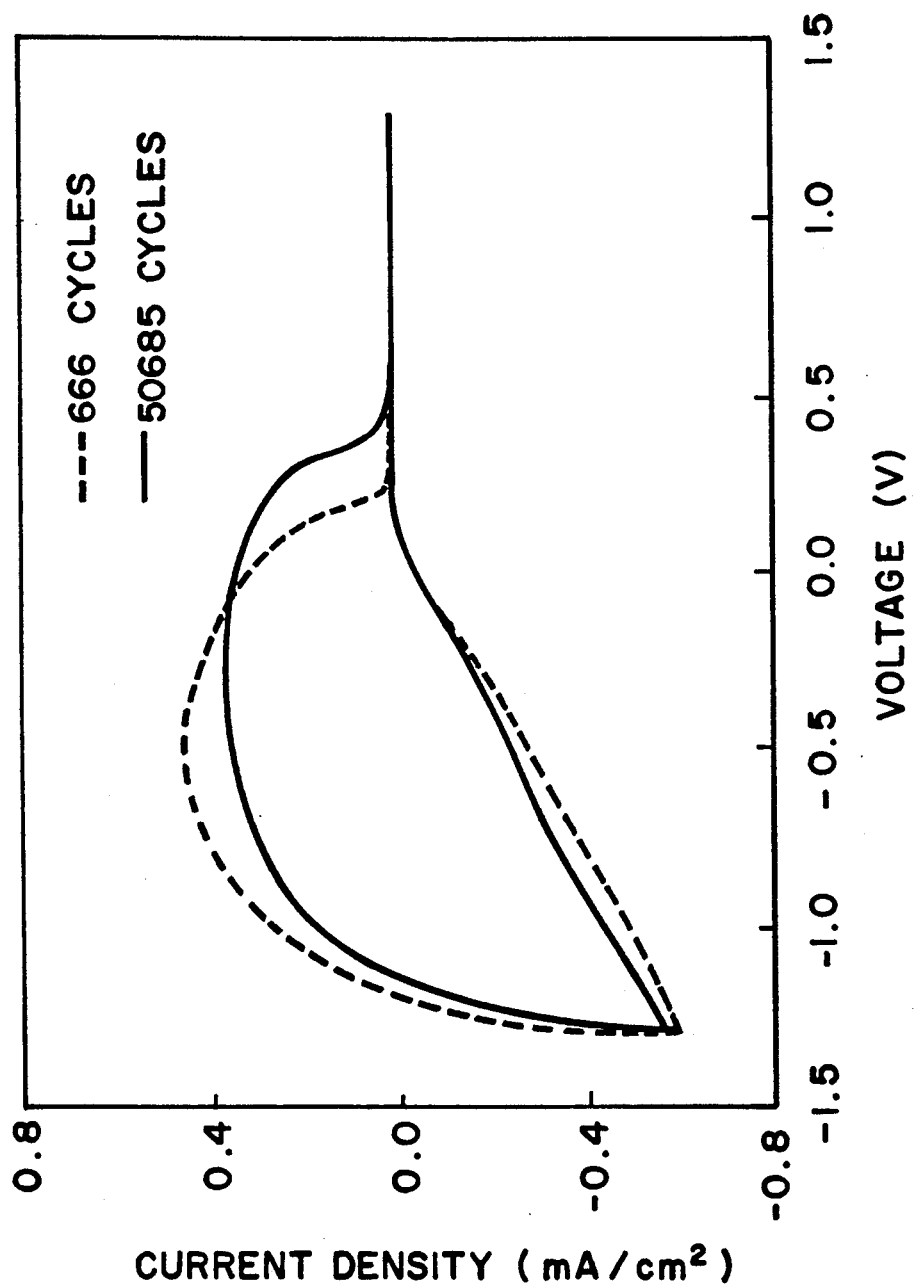
FIG. 4 shows the current voltage characteristics of an electrochromic device embodying the co-polymer of the present invention.

A variable transmittance electrochromic device was assembled by laminating an amorphous $WO_3$ coated ITO-glass substrate and an $IrO_2$ coated ITO-glass with the polymer electrolyte of Example 2. Prior to lamination, the $IrO_2$ film was electrochemically reduced in a 0.5M $H_2SO_4$ electrolyte to provide $H^+$ ions for charge compensation during switching. After polymerization, the electrochromic device was electrically cycled between switching limits of ±1.3 V using a triangular waveform at a sweep rate of 20 mV/s. A total of 12 mC/cm$^2$ of charge was transported between the a-$WO_3$ and $IrO_2$ films during switching. The luminous transmittance (weighted to the photopic response of the human eye) of the device was controllable between 13% and 65% at the ±1.3 V limits. The device could be colored to any intermediate transmittance level, and retained any set transmittance indefinitely after power was removed. The device was then cycled over 50,000 times between these voltage limits without the degradation noted in Example 1. The current-voltage curves of the device after 666 and 50,685 switching cycles are shown in FIG. 4. There is no indication of the increase in charge that accompanies irreversible oxidation of the polymer.

EXAMPLE 4

Figure 5:
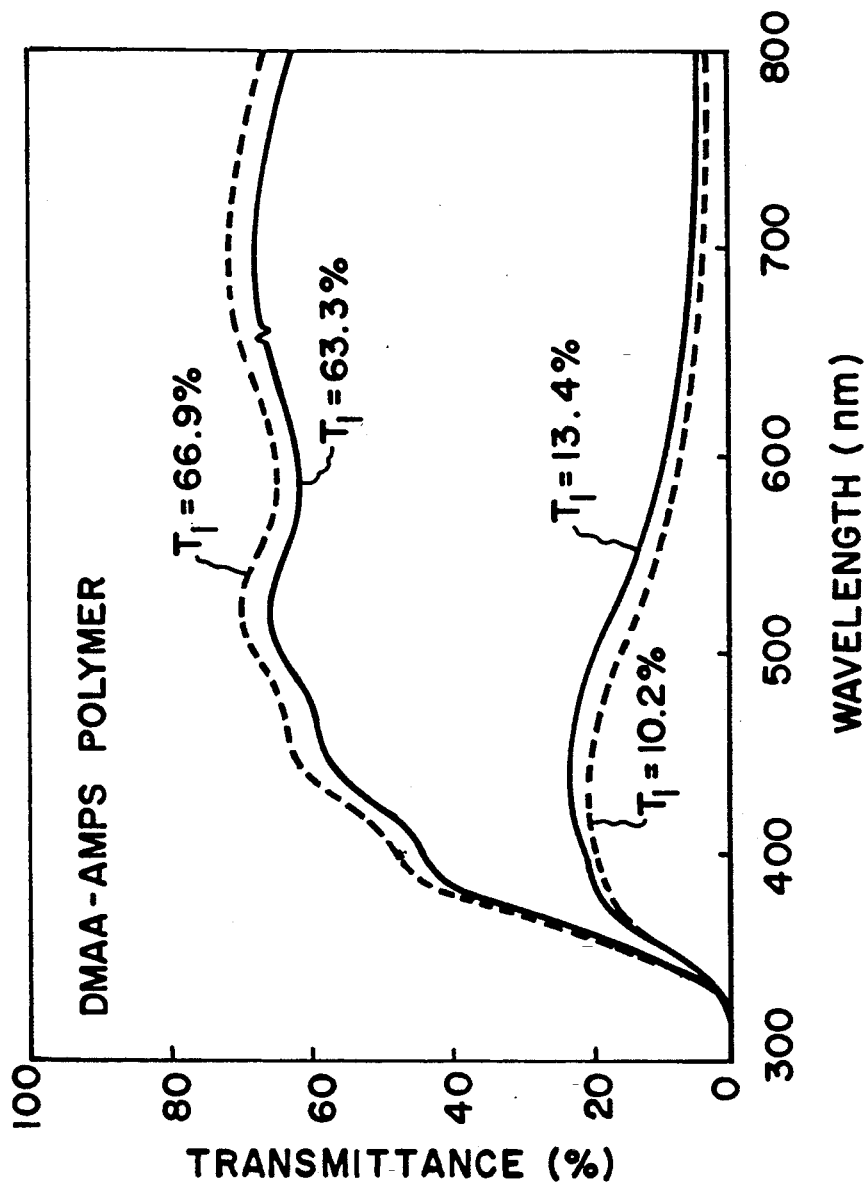
FIG. 5 shows the change in spectral transmittance after optical switching for 500 cycles of an electrochromic device embodying the co-polymer of the present invention.

A variable transmittance electrochromic device with a DMAA-AMPS co-polymer was assembled as described in Example 3. The electrochromic device was electrically cycled between switching limits of ±1.3 V using a triangular waveform at a sweep rate of 20 mV/s and the minimum and maximum spectral transmittance monitored. FIG. 5 compares the spectral transmittance of the device before (denoted by solid lines) and after (denoted by dashed lines) 500 switching cycles. The initial transmittance range of 13.4–63.3% has increased to 10.2–66.9% over the 500 cycle test. This result may be compared to that of Example 1 in which the HEMA-AMPS polymer device degraded to a non-functional transmittance range under the same test conditions.

EXAMPLE 5

An electrochromic display device was fabricated by adding to the polymer formulation of Example 2, 30% by weight of a titanium dioxide pigment (TI-PURE R-103-1 from DuPont) prior to polymerization. Following polymerization a white and optically opaque polymer was obtained. Thin films, 200–230 nm thick, of amorphous $WO_3$ were then deposited onto two ITO-coated glass slides by e-beam evaporation. One of the $WO_3$ films was electrochemically reduced with 10 mC/cm$^2$ of $H^+$ ion insertion in an electrolyte of 0.5M $H_2SO_4$. The coated slides were laminated with the polymer and the edges sealed with epoxy. The display device, so fabricated, was tested by making electrical connection to the ITO contacts and applying a 20 mV/s triangular voltage sweep between limits of ±1.2 V. The display device transferred 10 mC/cm$^2$ of charge during each voltage sweep. On each sweep, the device switched between white and blue. The intensity of the blue coloration was directly proportional to the magnitude of the applied coloring voltage. The $H^+$ ion conductivity of the pigmented polymer was $8 \times 10^{-6}$ S/cm as measured by AC impedance spectroscopy. The display device was switched for 25,000 full cycles without evidence of failure.

What is claimed is:

1. A co-polymer electrolyte, comprising a first monomer of a vinylic protonic acid and a second monomer comprising of either a N,N' dialkyl substituted acrylamide or a N,N'-dialkyl substituted methacrylamide or a mixture of the two, useful in electrochromic devices and exhibiting high anodic stability.

2. The polymer electrolyte defined by claim 1 further incorporating less than 25 weight percent of a liquid plasticizer.

3. The plasticized polymer electrolyte of claim 2 wherein said liquid plasticizer is chosen singly or as a mixture from the group water, propylene carbonate, γ-butyrolactone, dimethyl formamide, N-methyl pyrrolidone, ethyl acetate, acetonitrile, ethanol, methanol, and ethylene glycol.

4. The plasticized polymer electrolyte of claim 3 having an approximate composition by weight of 30% 2-acrylamido-2-methyl propane sulfonic acid, 50% N,N'-dimethyl acrylamide and 20% water.

5. An electrochromic device, comprising an electrochromic material and a counter electrode separated by and in contact with an electrolyte and also incorporating electrode means for injecting electrical current into said electrochromic material and counter electrode, said electrolyte comprising a co-polymer defined by claim 1.

6. The electrochromic device of claim 5 wherein said co-polymer is modified by the addition of a pigment or dye.

7. The electrochromic device of claim 5 wherein said co-polymer is modified by the addition of a molecule containing two or more vinyl groups for the purpose of cross-linking said co-polymer.

8. The electrochromic device of claim 5 wherein said electrochromic material comprises amorphous $WO_3$.

9. The electrochromic device of claim 5 wherein said counter electrode comprises an oxide of Ir.

10. The electrochromic device of claim 5, wherein said electrochromic layer and said counter electrode are comprised of amorphous $WO_3$ and said co-polymer electrolyte contains a pigment or dye.

* * * * *